United States Patent
Wei et al.

(10) Patent No.: US 12,363,699 B2
(45) Date of Patent: Jul. 15, 2025

(54) USER EQUIPMENT AND BASE STATION FOR ON-DEMAND MULTICAST BROADCAST SERVICE SYSTEM INFORMATION

(71) Applicant: Sony Group Corporation, Tokyo (JP)

(72) Inventors: Yuxin Wei, Basingstoke (GB); Vivek Sharma, Basingstoke (GB); Yassin Aden Awad, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 432 days.

(21) Appl. No.: 17/794,627

(22) PCT Filed: Feb. 11, 2021

(86) PCT No.: PCT/EP2021/053352
§ 371 (c)(1),
(2) Date: Jul. 22, 2022

(87) PCT Pub. No.: WO2021/165142
PCT Pub. Date: Aug. 26, 2021

(65) Prior Publication Data
US 2023/0051095 A1   Feb. 16, 2023

(30) Foreign Application Priority Data
Feb. 21, 2020   (EP) ..................................... 20158827

(51) Int. Cl.
*H04W 72/12* (2023.01)
*H04W 48/12* (2009.01)
(Continued)

(52) U.S. Cl.
CPC ....... *H04W 72/1215* (2013.01); *H04W 48/12* (2013.01); *H04W 72/23* (2023.01); *H04W 74/0833* (2013.01)

(58) Field of Classification Search
CPC . H04W 72/1215; H04W 48/12; H04W 72/23; H04W 74/0833; H04W 48/14
See application file for complete search history.

(56) References Cited

U.S. PATENT DOCUMENTS

2018/0206080 A1\* 7/2018 Chen ..................... H04W 76/40
2019/0223094 A1   7/2019 Ingale et al.
(Continued)

OTHER PUBLICATIONS

International Search Report and Written Opinion mailed on May 17, 2021, received for PCT Application PCT/EP2021/053352, filed on Feb. 11, 2021, 8 pages.
(Continued)

*Primary Examiner* — Ayanah S George
(74) *Attorney, Agent, or Firm* — XSENSUS LLP (57) ABSTRACT

A user equipment for a mobile telecommunications system, including circuitry configured to communicate with a base station of the mobile telecommunications system, wherein the circuitry is further configured to: detect scheduling information for on-demand multicast broadcast service system information, wherein the scheduling information is included in predetermined system information transmitted from the base station to the user equipment; and request the on-demand multicast broadcast service system information based on the detected scheduling information.

16 Claims, 4 Drawing Sheets

(51) Int. Cl.
*H04W 72/23*           (2023.01)
*H04W 74/0833*         (2024.01)

(56)            References Cited

U.S. PATENT DOCUMENTS

2019/0268879 A1* 8/2019 Lee .................... H04B 7/0695
2020/0359310 A1  11/2020 Ingale

OTHER PUBLICATIONS

3GPP, "Evolved Universal Terrestrial Radio Access (E-UTRA); Radio Resource Control (RRC); Protocol specification (Release 14)", 3GPP TS 36.331 V14.13.0, Dec. 2019, pp. 1-783.
3GPP, "Evolved Universal Terrestrial Radio Access (E-UTRA); Medium Access Control (MAC) protocol specification (Release 15)", 3GPP TS 36.321 V15.11.0, Dec. 2020, pp. 1-134.

* cited by examiner

USER EQUIPMENT AND BASE STATION FOR ON-DEMAND MULTICAST BROADCAST SERVICE SYSTEM INFORMATION

CROSS-REFERENCE TO RELATED APPLICATIONS

The present application is based on PCT filing PCT/EP2021/053352, filed Feb. 11, 2021, which claims priority to EP20158827.4, filed Feb. 21, 2020, the entire contents of each are incorporated herein by reference.

TECHNICAL FIELD

The present disclosure generally pertains to user equipments and base stations for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put, into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system may be based on LTE-A or NR, respectively, it is assumed, that specific requirements of the 5G technologies will, basically, be dealt with by features and methods which are already defined in the LTE-A and NR standard documentation.

Generally, 3GPP has already completed the basic version of 5G in Release 15 (Rel-15), which is known as New Radio. In addition, further enhancements have been almost finalized for Rel-16, incorporating new features such as 2-step Random Access channel (RACH), Industrial Internet of Things (IIoT) and NR-based Access to Unlicensed Spectrum.

Moreover, for the future, even further enhancements have been agreed on for Rel-17 such as Multicast and Broadcast Services (MBS) to enable general MBS services over the 5G system.

From LTE, for example, Multimedia Broadcast Multicast Services (MBMS) are known, where some MBMS control information is carried by means of specific system information, which is broadcasted periodically.

Although there exist signaling techniques for LTE, it is generally desirable to improve coexisting situations of multicast and unicast reception.

SUMMARY

According to a first aspect the disclosure provides a user equipment for a mobile telecommunications system, comprising circuitry configured to communicate with a base station of the mobile telecommunications system, wherein the circuitry is further configured to:
  detect scheduling information for on-demand multicast broadcast service system information, wherein the scheduling information is included in predetermined system information transmitted from the base station to the user equipment; and
  request the on-demand multicast broadcast service system information based on the detected scheduling information.

According to a second aspect the disclosure provides a user equipment for a mobile telecommunications system, comprising circuitry configured to communicate with a base station of the mobile telecommunications system, wherein the circuitry is, further configured to:
  receive multicast control channel scheduling information or a multicast control channel message included in a dedicated signaling from the base station.

According to a third aspect the disclosure provides a base station for a mobile telecommunications system, comprising circuitry configured to communicate with -a user equipment of the mobile telecommunications system and establish a cell, wherein the circuitry is further configured to:
  transmit predetermined system information including scheduling information for on-demand multicast broadcast service system information to the user equipment;
  receive a request for the on-demand multicast broadcast service system information from the user equipment; and
  transmit the on-demand multicast broadcast service system information to the user equipment in response to the received request for the on-demand multicast broadcast service system information.

According to a fourth aspect the disclosure provides a base station for a mobile telecommunications system, comprising circuitry configured to communicate with a user equipment of the mobile telecommunications system, wherein the circuitry is further configured to:
  transmit multicast control channel scheduling information or a multicast control channel message included in a dedicated signaling to the user equipment.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 4:
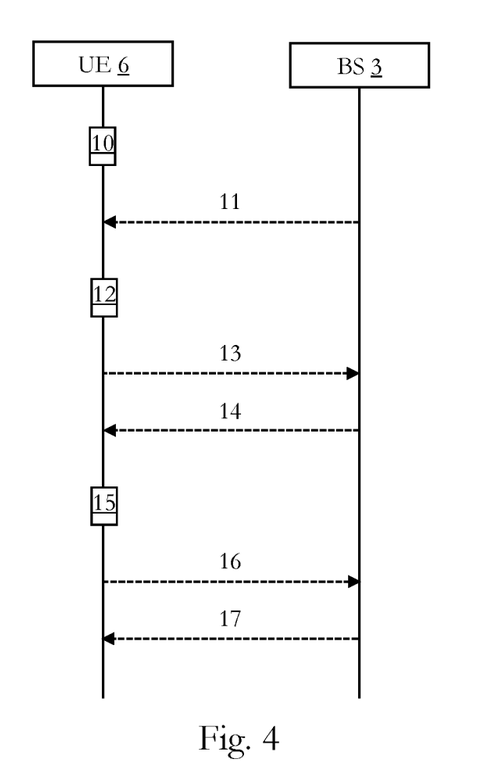
FIG. 4 illustrates in a state diagram a first embodiment of an on-demand multicast broadcast service system information request.

Before a detailed description of the embodiments under reference of FIG. 4 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice this year.

One of the candidates for meeting the 5G requirements are termed New Radio ("NR") Access Technology Systems. Some aspects of NR can be based on LTE technology, in some embodiments, just as some aspects of LTE were based on previous generations of mobile communications technology.

Generally, 3GPP has already completed the basic version of 5G in Release 15 (Rel-15), which is known as New Radio. In addition, further enhancements have been almost finalized for Rel 16, incorporating new features such as 2-step Random Access channel (RACH), Industrial Internet of Things (IIoT) and NR-based Access to Unlicensed Spectrum.

Moreover, as mentioned in the outset, for the future, even, further enhancements have been agreed on for Rel-17 such as Multicast and Broadcast Services (MBS) to enable general MBS services over the 5G system.

From LTE, for example, Multimedia Broadcast Multicast Services (MBMS) are known, which is a point-to-multipoint (PTM) interface specification designed to provide broadcast and multicast services.

Generally, a multicast service, in some embodiments, is based on a transmission of data using a subset of the available radio resources (the remaining resources are reserved to support transmissions towards a particular user equipment (unicast service/reception)) to a group of destination devices such as user equipments (UEs) for a mobile telecommunications system. The destination devices, for example, did subscribe to a specific desired multicast service provided by the network i.e. provided in a cell established by a base station. In a multicast communication in some embodiments, a base station of a mobile telecommunications system, such as an eNodeB in LTE or a gNB ("next generation eNodeB"), transmits the same data to multiple UEs simultaneously, as generally known.

Figure 1:
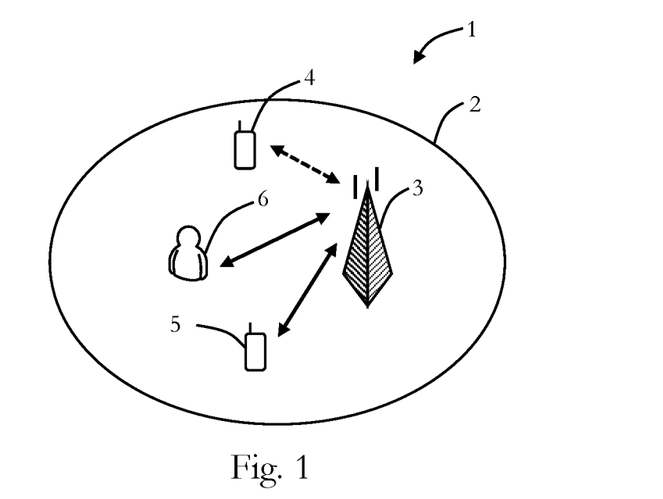
FIG. 1 illustrates schematically an embodiment of a radio access network.

A typical situation, in some embodiments, is illustrated in FIG. 1, where, for example, two user equipments (5 and 6) use multicast reception and one user equipment (4) uses unicast reception in a Radio Access Network 1 (RAN).

The cell 2 is established by a base station 3 (BS) of a mobile telecommunications system (such as a gNB) in which the user equipments 4, 5 and 6 can communicate with the BS 3. The user equipment 4 uses unicast reception as indicated by the dashed arrow and the user equipments 5 and 6 use multicast reception, as indicated by the solid arrows, wherein the of the multicast service is transmitted simultaneously from the BS 3 to the two user equipments 5 and 6.

In other embodiments, as generally known, multicast transmissions across multiple cells established by multiple base stations are performed by the configuration of a Multimedia Broadcast multicast service Single Frequency Network (MBSFN), wherein each base station is assigned a MBSFN area in which transmissions of base stations belonging to the same MBSFN area are synchronized (each base station is assigned a mbsfn-AreaID). In such embodiments, a user equipment using a multicast service receives the transmissions from multiple synchronized base stations, such that it appears to the user equipment as a transmission from a single large cell. In that sense, the embodiment as shown in FIG. 1 is illustrative also for embodiments where a MBSFN is configured.

As mentioned in the outset, in LTE, some MBMS control information necessary to receive or use multicast services is carried by means of specific system information, which is broadcasted periodically.

Typically, in LTE system information is broadcasted over a logical channel, e.g. the BCCH. Moreover, generally, the system information may have two parts, namely a static part and a dynamic part. The static part is typically called MIB (Master information Block), which includes useful information, such as channel bandwidth, transmit power, number of antennas, SIB (System Information Block) scheduling information and the like. The dynamic part is typically referred to as SIB including multiple subblocks.

System information is a type of control information, and includes, for example:

MIB: physical layer information of a LTE cell, e.g. transmission bandwidth configuration, system frame number, etc.

SIB1: information regarding whether or not UE is allowed to access the LTE cell, defines scheduling of other SIBs, and carries cell ID, SIB mapping information, etc.

In the following, as an introduction, some general explanations on MBMS are summarized, which can be found, for example, in 3GPP TS 36.331 (V14.13.0).

In general, the control information relevant only for UEs supporting MBMS is separated as much as possible from unicast control information. Most of the MBMS control, information is provided on a logical channel specific for MBMS common control information ("MCCH information" in the following): the MCCH (Multicast Control Channel). E-UTRA (Evolved UMTS Terrestrial Radio Access) employs one MCCH logical channel per MBSFN area.

The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED mode that are receiving or interested to receive one or more specific MBMS services.

A limited, amount of MBMS control information is provided on the BCCH (Broadcast Control Channel). This primarily concerns the information needed to acquire the MCCH(s). This information is carried by means of a single MBMS specific SystemInformationBlock: SystemInformationBlockType13. An MBSFN area is identified solely by the mbsfn-AreaId in SytemInformationBlockType13. At mobility, the UE considers that the MBSFN area is continuous when the source cell and the target cell broadcast the same value in the mbsfn-AreaId.

In Rel-14 (3GPP TS 36.331 (V14.13.0)) the SIB 13 includes the MCCH configuration information, wherein the IE (Information Element) SystemInformationBlockType13 contains the information required to acquire (via the MCCH (s)) the MBMS control information associated with one or more MBSFN areas:

PDCCH is used to inform UEs in RRC_IDLE mode and UEs in RRC_CONNECTED mode about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notification-Indicator is used to indicate changes for that MBSFN area: if the bit is set to "1", the corresponding MCCH will change. No further details are provided e.g. regarding which MCCH information will change. The MCCH information change notification is used to inform the UE about a change of MCCH information upon session start or about the start of MBMS counting.

| SystemInformationBlockType13 information element |
| --- |
| --ASN1START<br>SystemInformationBlockType13-r9 ::=  SEQUENCE {<br>  mbsfn-AreaInfoList-r9          MBSFN-AreaInfoList-r9,<br>  notificationConfig-r9          MBMS-NotificationConfig-r9,<br>  lateNonCriticalExtension       OCTET STRING                         OPTIONAL,<br>  ...,<br>  [[<br>  notificationConfig-v1430       MBMS-NotificationConfig-v1430        OPTIONAL<br>  ]]<br>}<br>--ASN1STOP |

| SystemInformationBlockType13 field description |
| --- |
| notificationConfig |

Indicates the MBMS notification related configuration parameters. The UE shall ignore this field when dl-Bandwidth included in MasterInformationBlock is set to n6.

The MCCH information is transmitted periodically, using a configurable repetition period. Scheduling information is not provided for MCCH i.e. both the time domain scheduling as well as the lower layer configuration are semi-statically configured, as defined within SystemInformationBlockType13.

For MBMS user data, which is carried by the MTCH (Multicast Transmission Channel) logical channel, E-UTRAN periodically provides MCH (Multicast Channel) scheduling information (MSI) at lower layers (MAC).

A change of MCCH information only occurs at specific radio frames, i.e. the concept of a modification period is used. Within a modification period, the same MCCH information may be transmitted a number of times (on the MCCH), as defined by its scheduling (which is, based on a repetition period).

Figure 2:
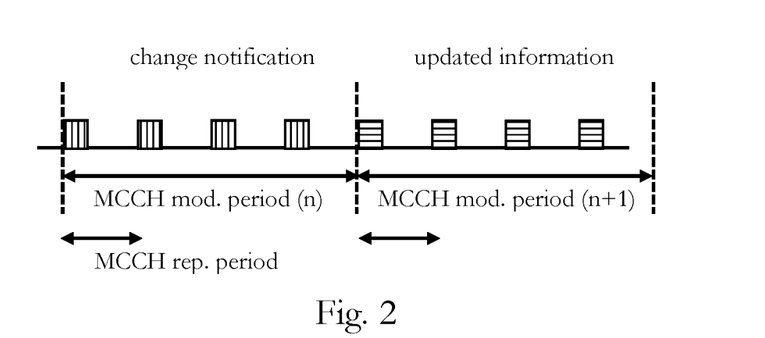
FIG. 2 illustrates schematically a change of MCCH information.

When the network changes (some of) the MCCH information, it notifies the UEs about the change during a first modification period (n) (the MCCH information change notification is transmitted periodically on PDCCH (Physical Downlink Control Channel)). In the next modification period (n+1), the network transmits the updated MCCH information. This is illustrated in FIG. 2, in which different fill patterns indicate different MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI (Radio Network Temporary Identifier), the M-RNTI (MBMS RNTI), on As mentioned above, for the future, 3GPP aims to provide general MBS services over the 5G system and based on a current work item of MBS services, some of the agreed objectives are:

Specify RAN (Radio Access Network) basic functions for broadcast/multicast for UEs in RRC_CONNECTED state (RRC—"Radio Resource Control") [RAN1, RAN2, RAN3]:
  Specify a group scheduling mechanism to allow UEs to receive Broadcast/Multicast service [RAN1, RAN2], wherein this objective includes specifying necessary enhancements that are required to enable simultaneous operation with unicast reception.

Specify RAN basic functions for broadcast/multicast for UEs in RRC_IDLE/RRC_INACTIVE states [RAN2, RAN1]:
  Specify required changes to enable the reception of PTM transmissions by UEs in RRC_IDLE/RRC_INACTIVE states, with the aim of keeping maximum commonality between RRC_CONNECTED state and RRC_IDLE/RRC_INACTIVE state for the configuration of PTM reception. [RAN2, RAN1].

Additionally, in New Radio, some of the system information (SI) may be provided based on an on-demand scheme. Of course, for example, the information included in NR SI is similar to the SI as of LTE (at least in some embodiments).

However, it has been recognized that the on-demand scheme may impact in some instances the design of SIBs 13/15/20 when the cell is established as a mixed-service provider (unicast, multicast, broadcast).

Hence, it has been further recognized that new SI provided in an on-demand manner may be required to indicate and provide multicast (control) channel(s) (or services) in a cell established by a base station and, thus, an on-demand broadcasting of multicast broadcast service system information should be supported in some embodiments.

Moreover, it has been recognized that, in some instances, the above-outlined provision of MCCH information may carry a lot of control signaling overhead and, thus, in order to reduce the overhead, the MCCH information should be provided in an on-demand manner in some embodiments.

Furthermore, it has been recognized that, in some instances, in order to further reduce the signaling overhead, the provision of the MCCH information should be based on the new SI, since, in some embodiments, no MCCH information is required if there are no available multicast services in the cell established by the base station.

Hence, some embodiments pertain to a user equipment for a mobile telecommunications system, including circuitry configured to communicate with a base station of the mobile telecommunications system, wherein the circuitry is further configured to:
 detect scheduling information for on-demand multicast broadcast service system information, wherein the scheduling information is included in predetermined system information transmitted from the base station to the user equipment; and
 request the on-demand multicast broadcast service system information based on the detected scheduling information.

The user equipment may be or may include an electronic device, a smartphone, a VR device, a laptop or the like. The circuitry of the user equipment may include at least one of: a processor, a microprocessor, a dedicated circuit, a memory, a storage, a radio interface, a wireless interface, a network interface, or the like, e.g. typical electronic components which are typically included in a user equipment to achieve the functions as described herein. The mobile telecommunications system may be based on UMTS, LTE, LTE-A, or an NR, 5G system or the like.

The on-demand multicast broadcast service system information (on-demand MBS-SI) includes the notificationConfig field of the SIB13 and the areaInfoList field of the SIB13. The on-demand MBS-SI may include an indication of the multicast (control) channel(s) or it may include the multicast (control) channel(s) itself.

The request for the on-demand MBS-SI may include one or more bits for a request for the MBS specific SI (e.g. notificationConfig, areaInfoList, indication of the multicast (control) channel(s)) and it may include one or more bits for a request for the multicast (control) channel(s) itself. Accordingly, the request for the MBS specific SI and the multicast (control) channel(s) itself may be performed independently or altogether based on the bit pattern in the request for the on-demand MBS-SI. Additionally, the request for the multicast (control) channel(s) itself may be implied in the request for the MBS specific SI.

Generally, cells established by base stations with the same value of mbsfn-AreaID belong to the same on-demand MBS-SI area. The on-demand MBS-SI may be a new SIB (on-demand MBS-SIB).

The scheduling information of the on-demand MBS-SI may include an indication if the on-demand MBS-SI is broadcasted (e.g. if the cell established by the base station does not support MBS or if only unicast services are provided), radio resource parameters necessary to request and receive the on-demand MBS-SI and the like, wherein the scheduling information of the on-demand MBS-SI is included in SIB1 (predetermined system information).

Hence, a UE which is interested in MBS and detects that the on-demand MBS-SI is not being broadcasted, the circuitry of the user equipment requests the on-demand MBS-SI based on the scheduling information from the base station. If the on-demand MBS-SI is signaled as being broadcasted and then the UE shall acquire the on-demand MBS-SI according to the scheduling information in SIB1.

The request for the on-demand MBS-SI may be performed within a radio resource establishment procedure or UE is already in Connected mode. For example, the request is included in a radio resource control connection setup request message, e.g. by adding a respective bit or bits or other indication in the request message, as mentioned above, that the on-demand MBS-SI is requested. The request may be performed by defining a new establishment cause to indicate it is for a request for the on-demand MBS-SI or the like. Moreover, the request for the on-demand MBS-SI may be included in a radio resource control system information request message (RRCSystemInfoRequest message).

In some embodiments, a separate RACH (Random Access Channel) resource is reserved for/in a RACH procedure (which is similar to Rel-15/16 behavior where a separate resource is reserved per SIB) for the request for the on-demand MBS-SI and the on-demand MBS-SI is transmitted in, the RAR (Random Access Response) from the base station to the UE in response to the request. The reserved RACH resource may include a transmission channel/physical layer, RACH time-frequency resource blocks or the like and/or may include a reserved preamble, a number or a set of preambles. The reserved RACH resource may be reserved in advance by the network i.e. the base station. In such embodiments, the reserved RACH resource is included in the scheduling information for the on-demand MBS-SI included in, the predetermined system information.

From the network point of view, if there are no UEs interested in MBS service in its coverage area, it does not need to broadcast the on-demand MBS-SI.

In other words, in some embodiments, the on-demand multicast broadcast service system information is requested in a random access channel procedure using a reserved random access channel resource According to the embodiments as described herein, some embodiments pertain to a base station for a mobile telecommunications system, including circuitry configured to communicate with a user equipment of the mobile telecommunications system and establish a cell, wherein the circuitry is further configured to:
 transmit predetermined system information including scheduling information for on-demand multicast broadcast service system information to the user equipment;
 receive a request for the on-demand multicast broadcast service system information-from the user equipment; and
 transmit the on-demand multicast broadcast service system information to the user equipment in response to the received request for the on-demand multicast broadcast service system information.

The base station may be an eNodeB, a NR gNB, or the like as a part of the mobile telecommunications system, which may be based on UMTS, LTE, LTE-A, or an NR, 5G system or the like.

The circuitry of the base station may include at least one of: a processor, a microprocessor, a dedicated circuit, a memory, a storage, a radio interface, a wireless interface, a network interface, or the like, e.g. typical electronic components which are included in a base station, such as an eNodeB, NR gNB, or the like. It may include an interface, such as a mobile telecommunications system interface which is adapted to provide communication to and/or from the mobile telecommunications system. It may also include a wireless interface, e.g. a wireless local area network interface, a Bluetooth interface, etc.

The transmission of the on-demand MBS-SI may be performed by broadcasting, multicasting, direct (addressed) transmission (unicast), transmission in a beam, etc.

The requested on-demand MBS-SI may be transmitted within a radio resource establishment procedure, e.g. included in a radio resource connection setup response message. Moreover, the requested on-demand MBS-SI may be transmitted in a system information message in response to a RRCSystemInfoRequest.

In some embodiments, as mentioned above, a separate RACH (Random Access Channel) resource is reserved for/in a RACH procedure for the request for the on-demand MBS-SI and the on-demand MBS-SI is transmitted in the RAR (Random Access Response) from the base station to the UE in response to the request. The reserved RACH resource may include a transmission channel/physical layer, RACH time-frequency resource blocks or the like and/or may include a reserved preamble, a number of or a set of preambles. The reserved RACH resource may be reserved in advance by the network i.e. the base station. In such embodiments, the reserved RACH resource is included in the scheduling information for the on-demand MBS-SI included in the predetermined system information.

As mentioned above, the MCCH information should be provided in an on-demand manner and this information is provided on the logical channel MCCH, which carries the MBSFNAreaConfiguration message, which indicates the MBMS sessions that are ongoing as well as the (corresponding) radio resource configuration. The MCCH may also carry the MBMSCountingRequest message. Both messages are referred to multicast control channel message (MCCH message) in the following.

Hence, in some embodiments, the on-demand multicast broadcast service system, information includes multicast control channel scheduling information.

The multicast control channel scheduling information (MCCH scheduling information) includes an indication whether the MCCH message is broadcasted and when the MCCH message is broadcasted (e.g. time domain scheduling and lower layer configuration) In other words, it includes necessary information for acquiring the MCCH (information) and, thus, the MCCH messages can be requested. Consequently, the MCCH information is provided in an on-demand manner.

In addition, at least some of the embodiments as described herein also apply to SC-MCCH (Single Cell-MCCH) as well.

Generally, a UE which is interested in MBS service should be interested in the MCCH message, as well, in some embodiments. For the MCCH message that is not being broadcasted, the UE may send a MCCH request independently e.g. via a RACH procedure.

Hence, in some embodiments, the circuitry of the user equipment is further configured to:
  request a multicast control channel message from the base station based on, the detected scheduling information of the on-demand multicast broadcast service system information and the multicast control channel scheduling information.

Accordingly, in some embodiments, the circuitry of the base station is further configured to:
  receive a request for a multicast control channel message from the user equipment; and
  transmit the requested multicast control channel message to the user equipment in response to the received request for the multicast control channel message.

In some embodiments, the request for the on-demand MBS-SI and the MCCH message are independent from each other, as mentioned above.

In some embodiments, the request for the on-demand multicast broadcast service system information implies the request for the multicast control channel message.

In such embodiments, a request for the on-demand MBS-SI implicitly includes the request for the MCCH message and thus, the base station transmits both the on-demand MBS-SI and the MCCH messages to the user equipment. Hence, no additional signaling is needed.

In some embodiments, the request for the on-demand multicast broadcast service system information includes the request for the multicast control channel message.

In the case, for example, that the MCCH information is expired, a UE, which is interested in MBS, may include the MCCH request in the MBS SIB request (e.g. by one or more bits).

As mentioned above, the network may change the MCCH information on the MCCH and a UE-using an available multicast service may need to update the stored MCCH information in order to further receive the data of the multicast service. However, as mentioned above, the approach, which uses modification periods in which MCCH information is transmitted periodically and where on update a MCCH change notification is transmitted, produces signaling overhead.

Hence, in some embodiments, the on-demand multicast broadcast service system information includes a multicast control channel change notification.

This may be indicated by one or more bits or a bitmap in the on-demand MBS-SI.

As mentioned above, in some embodiments, the on-demand multicast broadcast service system information is requested in a random access channel procedure using a reserved random access channel resource.

Hence, in some embodiments, the circuitry of the base station is further configured to:
  reserve a random access channel resource for the request for the on-demand multicast broadcast service system information in a random access channel procedure.

Generally, the Rel-14 MBMS counting procedure is for RRC_CONNECTED mode UEs only. But with the above-described on-demand MBS-SI request, in some embodiments, the network can figure out whether there are less MBS subscribers within the cell established by a base station, e.g. if there is less than a predefined number of RRC_IDLE mode UEs to send on-demand MBS-SI requests within a predefined period. With this information, for those UEs which want to receive MBS, in some embodiments, the network may provide unicast service instead and UEs will request the MBS service via unicast.

From network point of view, in some embodiments, the network (i.e. base station) determines to stop MBS service e.g. because the subscribers are becoming less and the base station prefers a unicast service instead. After reception of an on-demand MBS-SI request from a UE, in some embodiments, the base station determines to not transmit any RAR (Random Access Response) and after several rounds (number of rounds may be configured by the network or left to UE implementation or UE sends it once and on no response within RAR window, UE decide to trigger unicast reception). In such embodiments, the UE tries to switch to a unicast service. Alternatively, in some embodiments, the network replies with a RAR to indicate the UE to switch to unicast (there will be no on-demand MBS-SI to be transmitted to the UE).

Hence, in some embodiments, the circuitry of the user equipment is further configured to:
receive a random access response from the base station; and
initiate another random access channel procedure using another random access channel resource for switching to an unicast service if the random access response includes an indication for switching to the unicast service or when a random access response window is exceeded.

Accordingly, in some embodiments, the circuitry of the base station is further configured to:
determine to transmit a random access response to the user equipment based on a number of subscribers to at least one multicast broadcast service provided in the cell established by the base station.

In some embodiments, another RACH procedure is not required. In such embodiments, the UE sends a RACH preamble for requesting the on-demand MBS-SI and the network (i.e. base station) determines that the UE should switch to unicast (e.g. based on a number of subscribers or a number of requests for the on-demand MBS-SI and the like) and sends the RAR with the same content as Msg2/4 of 4 step/2 step RACH procedure. If the RAR includes an UL (uplink) grant for Msg3, in such embodiments, the sends Msg3 and continues with the rest, of the procedure for transition to RRC_CONNECTED mode.

In some embodiments, the circuitry of the base station determines to transmit the random access response to the user equipment further based on a number of requests, for the on-demand multicast broadcast service system information.

In some embodiments, the random access response includes an indication for switching to an unicast service.

Generally, the conventional LTE MCCH indicates the subframe allocation for MBMS and used Modulation Coding Scheme (MCS). There was no beamforming related information in LTE MBMS because it assumed the conventional MBMS did not support MIMO (Multiple Input Multiple Output)/beamforming, since MBMS should cover a wide area for many users by broadcasting and, thus, no support of beamforming was a reasonable assumption.

Figure 3:
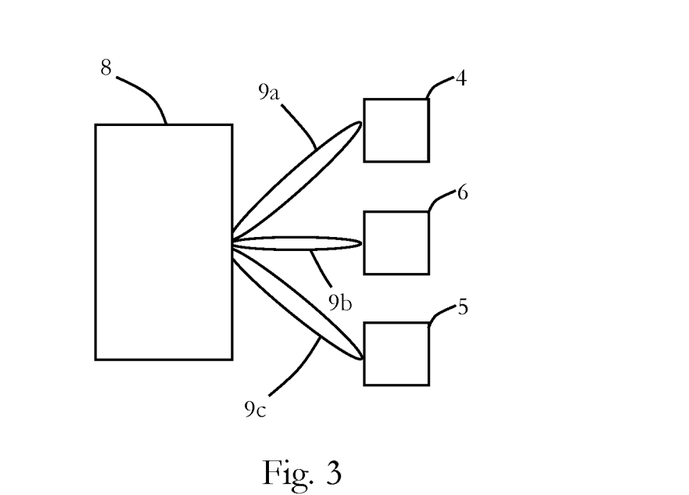
FIG. 3 illustrates schematically beamforming of beams emitted from an antenna array.

FIG. 3 illustrates schematically beamforming of beams emitted from an antenna array.

Generally, beamforming is known and it is achieved, for example, by using multiple antennas to control the direction of a wavefront by appropriately weighting the magnitude and phase of individuals antenna signals. For instance, this may provide better coverage to specific areas along the edges of cells, but also specific UEs may be provided with a specific beam.

In FIG. 3 schematically an antenna array 8 is illustrated, which may be employed by anyone of the base stations as described herein, e.g. the base station (gNB) of FIG. 1.

The antenna array 8 can provide several beams by the above-mentioned beamforming, for example, beams 9a, 9b and 9c for communicating with different UEs, e.g. UEs 4, 5 and 6.

In NR, there are several possible options for the support of beamforming in MBS and its reference signals.

1) In some embodiments, SS-block (Synchronisation Signal-block) based beamforming:

REL-15 NR supports SS-block based beamforming. The base station, e.g. a gNB, transmits an SS-block with beamforming. The UE assumes PDCCH/PDSCH come from the same beam direction with the SS-Block. The UE demodulates the PDCCH/PDSCH with the reference signal in the SS-block. The gNB sweeps the SS-beam without a knowledge of the UE position. The UE selects the best beam among multiple SS-blocks. This does not require to receive the configurations of transmission configuration indication (TCI) because the relation of PDCCH/PDSCH and the reference signal is not changed. This may be useful in some embodiments for saving poor cell edge coverage and RRC_IDLE mode UE may use it.

2) In some embodiments, CSI-RS (Channel State Information-Reference Signal) based beamforming:

REL-15 NR supports CSI-RS based beamforming in RRC_CONNECTED mode. Based on the UE CSI feedback, the gNB transmits PDCCH/PDSCH with a specific beam for the target UE. The gNB informs the UE about the configured reference signal of the UE Transmission Configuration Indication (TCI) states. The UE demodulates the PDCCH/PDSCH with the configured CSI-RS. The gNB targets the beam for a specific UE. This may be useful for accurate beam direction and reliable communication, however, CSI feedback, which is configured in connected mode, is required.

3) In some embodiments, location based or relay or group based beamforming:

Comparing with SS-block based beamforming, this beam is relatively narrower than the SS-block based beam, e.g. if the location of the UE is known (generally, a UE can transmit assistance information to the gNB) or a group of UEs are within proximity. The telecom operator may have a good knowledge of dense areas from measurement functions such as minimized drive test (MDI), for example, if the town centre or residential area is located for the specific beam direction in a macro cell coverage, the gNB focuses on this direction which is important for the good service, area of MBS. Alternatively, the gNB may estimate the number of UEs (both connected and idle), for example, the gNB may count connected mode MBS UE and measure its position. Then, the base station estimates the total number of MBS UEs for the direction from historical statistics. If one compares this with CSI-RS based beaming, the present approach does not require that every UE within that group sends feedback, e.g. CSI to network. Thus, this method can be applicable for RRC_IDLE mode UE. A problem of it may be that IDLE mode UE may not receive the configurations of transmission configuration indication (TCI) which indicates the relation between PDCCH beam and PDSCH beam for MBS and its reference signals because it was configured in connected mode in the conventional way. Therefore, the configurations should be included in MCCH (information) or system information (e.g. on-demand MBS-SI) for idle mode UEs in the same direction. This may be useful, in some embodiments, for better service coverage in dense area and RRC_IDLE mode UE may use it.

4) In some embodiments, no beamforming:

If many UEs are located in various locations in an MBS area, the number of beams could be too many if beamforming is applied. For example, a micro cell in an urban area, a gNB may accommodate many UEs in all directions. Thus, in some embodiments, it may be better not to use beamforming. The gNB uses the common reference signal for MBSFN UEs. Instead of beamforming, the gNB sends it with higher power to compensate it. Or, a UE at cell edge may switch unicast from multicast/broadcast to compensate it.

It has been recognized that the content of MCCH information may include the beamforming configuration of MTCH physical layer based on above options and/or feedback patterns. If no beamforming is selected, this information may be included in a SIB (e.g. SIB13).

Moreover, it has been recognized that the above information (beam configuration information) should be included in the on-demand MBS-SI or the MCCH message.

Hence, in some embodiments, the on-demand multicast broadcast service system information or the multicast control channel message includes beamforming, configuration information of the base station.

For UEs in RRC_CONNECTED mode, it has been recognized that, in alternative embodiments, the MCCH scheduling information or the MCCH message itself should be included in a dedicated signaling e.g. the RRCReconfigurationMessage.

Hence, some embodiments pertain to a user equipment for a mobile telecommunications system, including circuitry configured to communicate with a base station of the mobile telecommunications system, wherein the circuitry is further configured to:

receive multicast control channel scheduling information or a multicast control channel message included in a dedicated signaling from the base station.

Accordingly, some embodiments pertain to a base station for a mobile telecommunications system, including circuitry configured to communicate with a user equipment of the mobile telecommunications system, wherein the circuitry is further configured to:

transmit multicast control channel scheduling information or a multicast control channel message included in, a dedicated signaling to the user equipment.

Returning to FIG. 4, which illustrates in a state diagram a first embodiment of an on-demand multicast broadcast service system information request.

The user equipment 6 (UE) powers up at 10, searches for operator network, camps on a cell 2 established by the base station 3 (BS), as illustrated in FIG. 1, and searches for system information for configuration, e.g. the MIB and the SIB1 included in the system information.

The BS 3 is basically configured to communicate with the UE 6 and to provide multicast services in the cell 2. Thus, the BS 3 transmits (e.g. broadcasts) the SIB1 (predetermined system information) including scheduling information for on-demand multicast broadcast service system information (on-demand MBS-SI) to the UE 6 at 11.

At 12, the UE 6 receives the predetermined system information including the scheduling information for the on-demand MBS-SI, which includes an indication that the on-demand MBS-SI can be requested on-demand and not being broadcasted and which includes the necessary radio resource parameters for requesting and receiving the on-demand MBS-SI, wherein these are included in the scheduling information for the on-demand MBS-SI. Upon reception of the predetermined system information, i.e. the SIB1, the UE 6 detects the scheduling information for the on-demand MBS-SI. Moreover, the UE 6 detects, for example, from information held in a memory that it is interested in a multicast service.

Hence, the UE 6 initiates a radio resource establishment procedure (via a RACH), at 13, and transmits a radio resource control system information request message (RRC-SystemInfoRequest message) including a request for the on-demand MBS-SI to the BS 3 based on the detected scheduling information for the on-demand. MBS-SI. This request, included in the RRCSystemInfoRequest message, is received by the BS 3.

In this embodiment, the request for the on-demand MBS-SI includes the request for the MBS specific SI and the MCCH itself.

In response to the received request, the BS 3 transmits the on-demand MBS-SI to the UE 6 at 14, wherein the on-demand MBS-SI includes the multicast (control) channel(s), the notificationConfig field of the SIB13 and the areaInfoList field of the SIB13. The on-demand MBS-SI is included in a system information message in response to the RRC-SystemInfoRequest.

Moreover, the on-demand MBS-SI includes multicast control channel scheduling information (MCCH scheduling information), which, include an indication whether a MCCH message (e.g. MBSFNAreaConfiguration) is broadcasted on-demand and when the MCCH message is broadcasted (e.g. time domain scheduling and lower layer configuration).

At 15, the UE 6 receives the on-demand MBS-SI including the MCCH scheduling information.

Based on the detected scheduling information and the MCCH scheduling information the UE 6 requests the MCCH message at 16 (via the MCCH) in order to receive MCCH information for using the available multicast services.

At 17, the requested MCCH message is transmitted from the BS 3 to the UE 6 (via the MCCH).

Accordingly, in this embodiment, the information, required to receive and use multicast service in the cell 2 established by the BS 3 is provided in an on-demand manner and signaling overhead may be reduced.

In this embodiment, the request for the on-demand MBS-SI and the request for the MCCH message are transmitted from the UE 6 independently.

In another embodiment, the request for the on-demand MBS-SI implies the request for the MCCH message. In such embodiments, the step 16 is not required, since the BS 3 transmits at 14 on-demand MBS-SI including the MCCH scheduling information. The MCCH scheduling information are received at 15 by the UE 6 and, thus, the UE 6 can configure the MCCH in order to receive the MCCH message at 17, which is transmitted to the UE 6, since the request for the MCCH message was implied.

Moreover, in an alternative embodiment, the request for the on-demand MBS-SI includes the request for the MCCH message, which is based on one or more bits included in the request for the on-demand MBS-SI.

Furthermore, the transmitted on-demand MBS-SI at 14 may include a MCCH change notification indicative for a time when the MCCH message changes, which is based on one or more bits or bitmap in the on-demand MBS-SI. Then, the UE 6 waits at 15 until the indicated time with the request for the MCCH message at 16 (or the BS 3 waits, in embodiments where the request is implied or included, with the transmission at 17 until the new MCCH information is valid). Accordingly, at 17 the new MCCH message is transmitted.

Additionally, as illustrated in FIG. 3, the BS 3 may support beamforming and the transmitted on-demand MBS-SI at 14 may include beamforming configuration information. Then, the on-demand MBS-SI transmitted, for example, to the UE 6 and the UE 5 (see FIGS. 1 and 3) include different beamforming configuration information.

Figure 5:
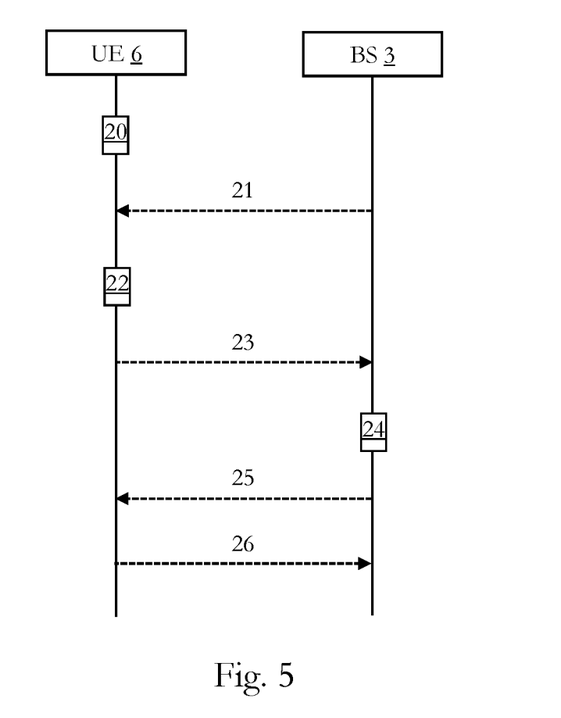
FIG. 5 illustrates in a state diagram a second embodiment of an on-demand multicast broadcast service system information request.

FIG. 5 illustrates in a state diagram a second embodiment of an on-demand multicast broadcast service system information request.

The user equipment 6 (UE) powers up at 20, searches for operator network, camps on a cell 2 established by the base station 3 (BS), as illustrated in FIG. 1, and searches for system information for configuration, e.g. the MIB and the SIB1 included in the system information.

The BS 3 is basically configured to communicate with the UE 6 and to provide multicast services in the cell 2. Thus, the BS 3 transmits (e.g. broadcasts) the SIB1 (predetermined system information) including scheduling information for on-demand multicast broadcast service system information (on-demand MBS-SI) to the UE 6 at 21.

At 22, the UE 6 receives the predetermined system information including the scheduling information for the on-demand MBS-SI, which includes an indication that the on-demand-MBS-SI can be requested on-demand and not being broadcasted and which includes the necessary radio resource parameters for requesting and receiving the on-demand MBS-SI, wherein these are included in the scheduling information for the on-demand MBS-SI. Upon reception of the predetermined system information, i.e. the SIB1, the UE 6 detects the scheduling information for the on-demand MBS-SI. Moreover, the UE 6 detects, for example, from information held in a memory that it is interested in a multicast service.

Furthermore, the detected scheduling information includes parameters for a reserved RACH resource, which is reserved in advance by the network, i.e. BS 3, for requesting the on-demand MBS-SI.

At 23, the UE 6 transmits a RACH preamble including the request for the on-demand MBS-SI and awaits a Random Access Response (RAR) from the BS 3 within a RAR window (i.e. within a predetermined time). In this embodiment, the request for the on-demand MBS SI includes the request for the MBS specific SI and the MCCH itself.

In this embodiment, at 24, the BS 3 determines to transmit the RAR to the UE 6 based on a number of subscribers to at least one multicast broadcast service provided in the cell 2 established by the BS 3 and based on a number of requests for the on-demand MBS-SI.

As mentioned above, when the number of subscribers or the number of requests is too less, the network determines to switch to unicast service instead.

Here, the BS 3 determines to transmit an indication for switching to a unicast service included in the RAR to the UE 6 at 25 in response to the request for the on-demand MBS-SI.

It is noted that, in an alternative embodiment, the BS 3 determines to transmit no RAR within the RAR window to indicate the UE 6 to switch to unicast service. In such embodiments, the step 25 is not performed.

Upon reception of the RAR, at 26, the UE 6 initiates another RACH procedure using another RACH resource for switching to the unicast service.

It is noted that, if the BS 3 determines to transmit the requested on-demand MBS-SI at 24 and includes it at 25 in the RAR, the steps from 15 onwards of the embodiment of FIG. 4 are performed and the alternative embodiments discussed there are also implemented in this embodiment.

Accordingly, in this embodiment, the information required to receive and use multicast service in the cell 2 established by the BS 3 is provided in an on-demand-manner and signaling overhead may be reduced. Moreover, the BS 3 and the UE 6 can use unicast and multicast services in parallel depending on the number of users interested in such services in the cell 2. In addition, the BS 3 can provide unicast and multicast service depending on the beamforming configurations, since the beamforming configuration information can be included in the on-demand MBS-SI.

Figure 6:
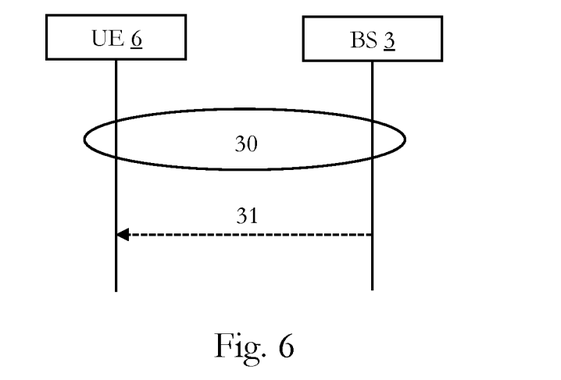
FIG. 6 illustrates in a state diagram an embodiment of multicast control channel scheduling information and a multicast control channel message included in a dedicated signaling.

FIG. 6 illustrates in a state diagram an embodiment of multicast control channel scheduling information and a multicast control channel message included in a dedicated signaling.

At 30, the UE 6 and the BS 3 have completed RRC connection setup and the UE 6 is in RRC_CONNECTED mode.

Upon a change of radio resource parameters, at 31, the base station transmits multicast control scheduling information or a multicast control channel message included in a dedicated signaling, e.g. in a RRCReconfigurationMessage, to the user equipment.

Figure 7:
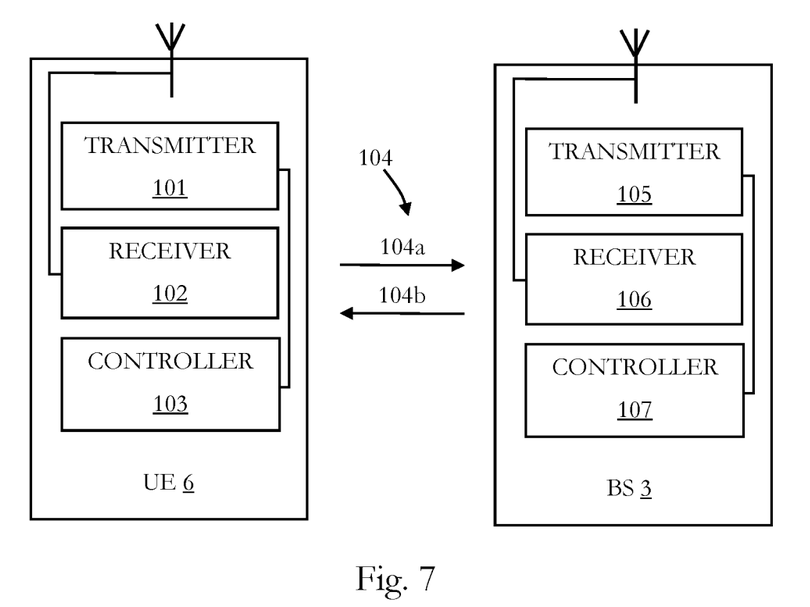
FIG. 7 illustrates in a block diagram an embodiment of a user equipment and a base station.

An embodiment of a user equipment (UE) 6, a base station (BS) 3 (e.g. NR eNB/gNB), a communication path 104 between the UE 6 and the BS 3, which is used for implementing embodiments of the present disclosure, is discussed under reference of FIG. 7.

The UE 6 has a transmitter 101, a receiver 102 and a controller 103, wherein, generally, the technical functionality of the transmitter 101, the receiver 102 and the controller 103 are known to the skilled person, and, thus, a more detailed description of them is omitted.

The BS 3 has a transmitter 105, a receiver 106 and a controller 107, wherein also here, generally, the functionality of the transmitter 105, the receiver 106 and the controller 107 are known to the skilled person, and, thus, a more detailed description of them is omitted.

The communication path 104 has an uplink path 104a, which is from the UE 6 o the BS 3, and a downlink path 104b, which is from the BS 3 to the UE 6.

During operation, the controller 103 of the UE 6 controls the reception of downlink signals over the downlink path 104b at the receiver 102 and the controller 103 controls the transmission of uplink signals over the uplink path 104a via the transmitter 101.

Similarly, during operation, the controller 107 of the BS 3 controls the transmission of downlink signals over the downlink path 104b over the transmitter 105 and the controller 107 controls the reception of uplink signals over the uplink path 104a at the receiver 106.

Figure 8:
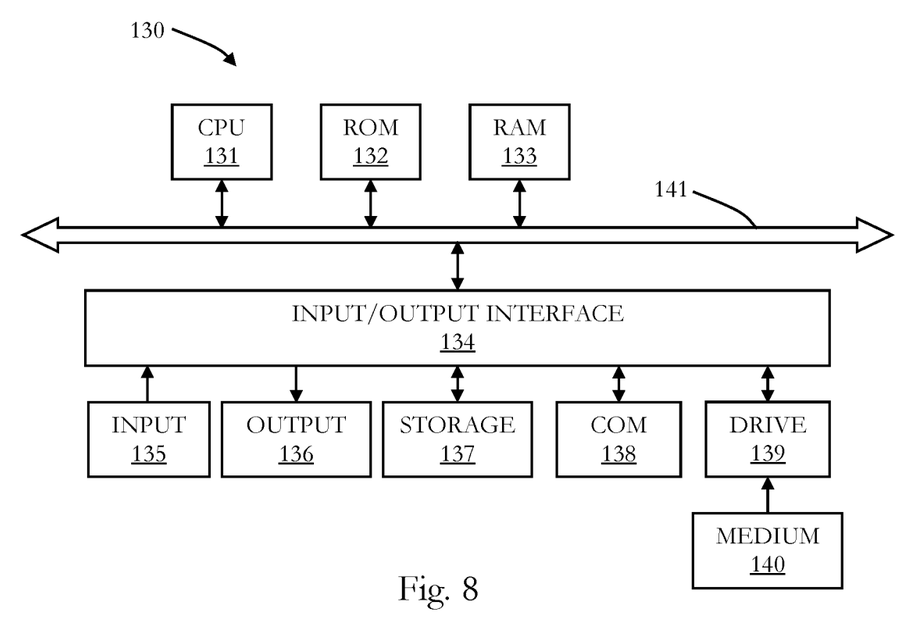
FIG. 8 illustrates in a block diagram a multi-purpose computer which can be used for implementing a user equipment and a base station.

FIG. 8 illustrates in a block diagram a multi-purpose computer 130 which can be used for implementing a user equipment and a base station.

The computer 130 can be implemented such that it can basically function as any type of user equipment or base station or new radio base station, transmission and reception point, as described herein. The computer has components 131 to 141, which can form a circuitry, such as any one of the circuitries of the base stations, and user equipments, and the like as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal splay, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). The computer 130 is also implemented to transmit data in accordance with TCP. Moreover, the computer 130 may have one or more antennas and/or an antenna array. The present disclosure is not limited to any particularities of such protocols.

All units and entities described in this specification and claimed in the appended claims can, if not stated otherwise, be implemented as integrated circuit logic, for example on, a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A user equipment for a mobile telecommunications system, including circuitry configured to communicate with a base station of the mobile telecommunications system, wherein the circuitry is further configured to:
detect scheduling information for on-demand multicast broadcast service system information, wherein the scheduling information is included in predetermined system information transmitted from the base station to the user equipment; and
request the on-demand-multicast broadcast service system information based on the detected scheduling information.

(2) The user equipment of (1), wherein the on-demand multicast broadcast service system information includes multicast control channel scheduling information.

(3) The user equipment of (2), wherein the circuitry is further configured to:
request a multicast control channel message from the base station based on the detected scheduling information of the on-demand multicast broadcast service system information and the multicast control channel scheduling information.

(4) The user equipment of (3), wherein the request for the on-demand multicast broadcast service system information implies the request for the multicast control channel message.

(5) The user equipment of (3) or (4), wherein the request for the on-demand multicast broadcast service system information includes the request for the multicast control channel message.

(6) The user equipment of anyone of (3) to (5), wherein the on-demand multicast broadcast service system information includes a multicast control channel change notification.

(7) The user equipment of anyone of (3) to (6), wherein the on-demand multicast broadcast service system information or the multicast control channel message includes beamforming configuration information of the base station.

(8) The user equipment of anyone of (1) to (7), wherein the on-demand multicast broadcast service system information is requested in a random access channel procedure using a reserved random access channel resource.

(9) The user equipment of (8), wherein the circuitry, is further configured to:
receive a random access response from the base station; and
initiate another random access channel procedure using another random access channel resource for switching to an unicast service if the random access response includes an indication for switching to the unicast service or when a random access response window is exceeded.

(10) A user equipment for a mobile telecommunications system, including circuitry configured to communicate with a base station of the mobile telecommunications system, wherein the circuitry is further configured to:
receive multicast control channel scheduling information or a multicast control channel message included in a dedicated signaling from the base station.

(11) A base station for a mobile telecommunications system, including circuitry configured to communicate with a user equipment of the mobile telecommunications system and establish a cell, wherein the circuitry is further configured to:
transmit predetermined system information including scheduling information for on-demand multicast broadcast service system information to the user equipment;
receive a request for the on-demand multicast broadcast service system information from the user equipment; and
transmit the on-demand multicast broadcast service system information to the user equipment in response to the received request for the on-demand multicast broadcast service system information.

(12) The base station of (11), wherein the on-demand multicast broadcast service system information includes multicast control channel scheduling information.

(13) The base station of (12), wherein the circuitry is further configured to:
receive a request for a multicast control channel message from the user equipment; and
transmit the requested multicast control channel message to the user equipment in response to the received request for the multicast control channel message.

(14) The base station of (13), wherein the request for the on-demand multicast broadcast service system information implies the request for the multicast control channel message.

(15) The base station of (13) to (14), wherein the request for the on-demand multicast broadcast service, system information includes the request for the multicast control channel message.

(16) The base station of anyone of (13) to (15), wherein the on-demand multicast broadcast service system information includes a multicast control channel change notification.

(17) The base station of anyone of (13) to (16), wherein the on-demand multicast broadcast service system information or the multicast control channel message includes beamforming configuration information of the base station.

(18) The base station of anyone of (11) to (17), wherein the circuitry is further configured to:
reserve a random access channel resource for the request for the on-demand multicast broadcast service system information in a random access channel procedure.

(19) The base station of (18), wherein the circuitry is further configured to:
determine to transmit a random access response to the user equipment based on a number of subscribers to at least one multicast broadcast service provided in the cell established by the base station.

(20) The base station of (19), wherein the circuitry determines to transmit the random access response to the user equipment further based on a number of requests for the on-demand multicast broadcast service system information.

(21) The base station of (19) or (20), wherein the random access response includes an indication for switching to an unicast service.

(22) A base station for a mobile telecommunications system, including circuitry configured to communicate with a user equipment of the mobile telecommunications system, wherein the circuitry is further configured to:
transmit multicast control channel scheduling information or a multicast control channel message included in a dedicated signaling to the user equipment.

The invention claimed is:

1. A user equipment for a mobile telecommunications system, comprising circuitry configured to communicate with a base station of the mobile telecommunications system, wherein the circuitry is further configured to:
detect scheduling information for on-demand multicast broadcast service system information, wherein the scheduling information is included in predetermined system information transmitted from the base station to the user equipment;
request the on-demand multicast broadcast service system information in a random access channel procedure using a reserved random access channel resource based on the detected scheduling information;
receive a random access response from the base station; and
initiate another random access channel procedure using another random access channel resource for switching to a unicast service if the random access response includes an indication for switching to the unicast service or when a random access response window is exceeded.

2. The user equipment according to claim 1, wherein the on-demand multicast broadcast service system information includes multicast control channel scheduling information.

3. The user equipment according to claim 2, wherein the circuitry is further configured to:
request a multicast control channel message from the base station based on the detected scheduling information of the on-demand multicast broadcast service system information and the multicast control channel scheduling information.

4. The user equipment according to claim 3, wherein the request for the on-demand multicast broadcast service system information implies the request for the multicast control channel message.

5. The user equipment according to claim 3, wherein the request for the on-demand multicast broadcast service system information includes the request for the multicast control channel message.

6. The user equipment according to claim 3, wherein the on-demand multicast broadcast service system information includes a multicast control channel change notification.

7. The user equipment according to claim 3, wherein the on-demand multicast broadcast service system information or the multicast control channel message includes beamforming configuration information of the base station.

8. A base station for a mobile telecommunications system, comprising circuitry configured to communicate with a user equipment of the mobile telecommunications system and establish a cell, wherein the circuitry is further configured to:
transmit predetermined system information including scheduling information for on-demand multicast broadcast service system information to the user equipment;
receive a request for the on-demand multicast broadcast service system information from the user equipment; and
transmit the on-demand multicast broadcast service system information to the user equipment in response to the received request for the on-demand multicast broadcast service system information, wherein
the circuitry is further configured to
reserve a random access channel resource for the request for the on-demand multicast broadcast service system information in a random access channel procedure; and
determine to transmit a random access response to the user equipment based on a number of subscribers to at least one multicast broadcast service provided in the cell established by the base station.

9. The base station according to claim 8, wherein the on-demand multicast broadcast service system information includes multicast control channel scheduling information.

10. The base station according to claim 9, wherein the circuitry is further configured to:
receive a request for a multicast control channel message from the user equipment; and transmit the requested multicast control channel message to the user equipment in response to the received request for the multicast control channel message.

11. The base station according to claim 10, wherein the request for the on-demand multicast broadcast service system information implies the request for the multicast control channel message.

12. The base station according to claim 10, wherein the request for the on-demand multicast broadcast service system information includes the request for the multicast control channel message.

13. The base station according to claim 10, wherein the on-demand multicast broadcast service system information includes a multicast control channel change notification.

14. The base station according to claim 10, wherein the on-demand multicast broadcast service system information or the multicast control channel message includes beamforming configuration information of the base station.

15. The base station according to claim 8, wherein the random access response includes an indication for switching to a unicast service.

16. A user equipment for a mobile telecommunications system, comprising circuitry configured to communicate with a base station of the mobile telecommunications system, wherein the circuitry is further configured to:
- detect scheduling information for on-demand multicast broadcast service system information including multicast control channel scheduling information, wherein the scheduling information is included in predetermined system information transmitted from the base station to the user equipment;
- request the on-demand multicast broadcast service system information based on the detected scheduling information; and
- request a multicast control channel message from the base station based on the detected scheduling information of the on-demand multicast broadcast service system information and the multicast control channel scheduling information, wherein
- the on-demand multicast broadcast service system information or the multicast control channel message includes beamforming configuration information of the base station.

* * * * *